(12) United States Patent
Ghosh

(10) Patent No.: US 8,190,211 B2
(45) Date of Patent: May 29, 2012

(54) SYSTEM, APPARATUS, AND METHOD FOR ASYMMETRICAL BEAMFORMING WITH EQUAL-POWER TRANSMISSIONS

(75) Inventor: Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 945 days.

(21) Appl. No.: 12/280,002

(22) PCT Filed: Feb. 20, 2007

(86) PCT No.: PCT/IB2007/050546
§ 371 (c)(1),
(2), (4) Date: Aug. 20, 2008

(87) PCT Pub. No.: WO2007/096820
PCT Pub. Date: Aug. 30, 2007

(65) Prior Publication Data
US 2009/0221241 A1    Sep. 3, 2009

Related U.S. Application Data

(60) Provisional application No. 60/775,589, filed on Feb. 22, 2006, provisional application No. 60/809,474, filed on May 30, 2006.

(51) Int. Cl.
*H04M 1/00* (2006.01)
(52) U.S. Cl. ........... 455/562.1; 455/132; 455/137; 455/506; 375/260; 375/299; 375/347; 370/204; 370/205; 370/319

(58) Field of Classification Search ............... 455/562.1, 455/132, 137, 506, 69; 375/260, 299, 347, 375/329, 355, 346; 370/204, 205, 319
See application file for complete search history.

(56) References Cited

U.S. PATENT DOCUMENTS

| 7,539,253 B2 * | 5/2009 | Li et al. ................. 375/260 |
| 2005/0129137 A1 | 6/2005 | Yamada |

FOREIGN PATENT DOCUMENTS

| EP | 1207645 A1 | 5/2002 |
| EP | 1530305 A2 | 5/2005 |
| WO | WO2006029261 A1 | 3/2006 |

OTHER PUBLICATIONS

June Chul Roh et al., "Channel Feedback Quantization Methods for MISO and MIMO Systems", Personal Indoor and Mobile Radio Communications, 2004, PIMRC 2004, 15th IEEE Intl Symposium on Barcelona, Spain, Sep. 2004, Piscataway, NJ, USA, IEEE, Sep. 2004, pp. 805-809, XP010754506.

(Continued)

*Primary Examiner* — Tuan Pham
(74) *Attorney, Agent, or Firm* — Larry Liberchuk

(57) ABSTRACT

The present invention provides a plurality of embodiments for beamforming in an asymmetrical system wireless communication system (400) of $N_T$ (102$_i$) transmit antennae and $N_R$ (104$_j$) receive antennae where $N_T > N_R$ that ensure the transmit power on each antenna is the same, without appreciable loss in performance. Additionally, a technique is provided for choosing fewer beamforming vectors than frequency bins in an OFDM system.

8 Claims, 5 Drawing Sheets

OTHER PUBLICATIONS

E. N. Onggosanusi et al., A Feedback-Based Adaptive Multi-Input Multi-output Signalling a Scheme, Institute of Electrical and Electronics Engineers, Conference Record of the 36th ASILOMAR Conference on Signals, Systems & Computers, Pacific Groove, CA, Nov. 2002, vol. 1 of 2, Conf. 36, Nov. 2002, pp. 1694-1698.

B. Mondal et al., "Adaptive Feedback for MIMO Beamforming Systems", Suignal Processing Advances in Wireless Communications, 2004 IEEE 5th Workshop on Lisbon, Portugal Jul. 2004, Piscataway, NJ, Jul. 2004, pp. 213-217, XP010806835.

K. Mukkavilli et al., "On Beamforming with Finite Rate Feedback in Multiple-Antenna Systems", IEEE Transactions on Information Theory, vol. 49, No. 10, pp. 2562-2579, Oct. 2003.

D.J. Love et al., Grassmanian Beamforming for Multiple-input Multiple-output Wireless Systems, IEEE Transactions on Information Theory, vol. 49, No. 10, pp. 2735-2747, Oct. 2003.

* cited by examiner

SYSTEM, APPARATUS, AND METHOD FOR ASYMMETRICAL BEAMFORMING WITH EQUAL-POWER TRANSMISSIONS

The present invention relates to asymmetrical beamforming in wireless networks such that the transmit power across all antennae is the same.

Beamforming using singular-value-decomposition (SVD) of the channel matrix is a well-known method for improving performance when multiple antennae are available. When the number of transmit and receive antennae are the same, the beamforming matrix is such that the transmitted power from each antenna is the same. However, in many cases the number of transmit antenna ($N_T$) is greater than the number of receive antennae ($N_R$). In such a situation, using only the subset of eigenvectors corresponding to the largest singular values gives rise to unequal transmission power across antennae. Since most transmit chains are peak-power limited this situation is not desirable.

The present invention provides a number of embodiments of techniques for implementing beamforming such that in an asymmetric system the transmit power across all antennae is the same.

Beamforming from multiple transmit antennae to multiple receive antennae is a well-known way of extracting channel diversity. When the number of transmit antennae ($N_T$) is equal to the number of receive antennae ($N_R$), using the eigenvectors of the channel matrix for beamforming is known to be the optimal strategy. In the asymmetric situation ($N_T > N_R$), the commonly used method is to pick the eigenvectors corresponding to the largest eigenvalues as the beamforming vectors. The problem with this approach is that this gives rise to unequal transmit power from each antenna. This is a problem since in most cases the RF chains are peak-power limited.

That is, when multiple RF front-ends are used in a multiple-antenna transmitter, it is a good idea to have each chain transmit the same power. This is because most RF amplifiers are limited by peak power and hence it is not easy to boost the power of one chain while lowering that of another in order to keep the total transmit power constant. This is more so for orthogonal frequency division multiplexing (OFDM) systems where the signal naturally has a large peak-to-average ratio and RF amplifiers have a back-off to keep them operating in the linear range.

Most currently used beamforming methods that have more transmit antennae than receive antennae have unequal transmit power on each transmit chain. The problem of equal-power transmissions for the $N_T \times 1$ case of a single transmit stream, has been solved, see K. K. Mukkavilli, A. Sabharwal, E. Erkip, and B. Aazhang, "On beamforming with finite rate feedback in multiple-antenna systems," IEEE Trans. Inform. Theory, vol. 49, no. 10, pp. 2562-2579, October 2003, and D. J. Love and R. W. Heath, Jr., "Grassmanian beamforming for multiple-input multiple-output wireless systems," IEEE Trans. Inform. Theory, vol. 49, no. 10, pp. 2735-2747, October 2003.

However, the problem for more than one transmit stream has not been solved.

The present invention provides several embodiments for asymmetrical beamforming that ensure the transmit power on each antenna is the same, without appreciable loss in performance. Additionally, a technique is provided for choosing fewer beamforming vectors than frequency bins in an OFDM system. This latter technique is useful in an embodiment where the vectors are feedback instead of assuming that the transmitter has channel knowledge and can compute the vectors.

The preferred embodiments provide techniques that include:
Technique 1: Brute force normalization;
Technique 2: Quantization to $\pm 1 \pm j$ values only;
Technique 3: Optimization based on outage probability;
Technique 4: Hybrid Optimization; and
Technique 5: Optimization across frequency domain.

The present invention applies to both open and closed loop systems, i.e., the former having a transmitter that has knowledge of the channel, estimates Q and uses one of the foregoing techniques to adjust Q and the latter having the receiver perform these actions.

Figure 1:
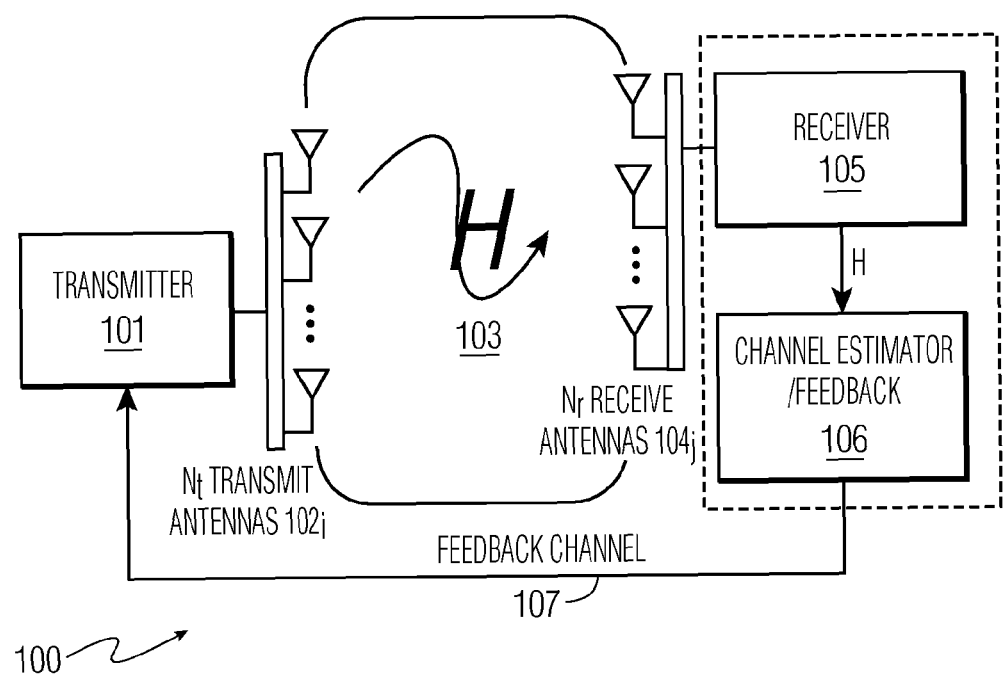
FIG. 1 illustrates an asymmetric communication system with a feedback channel.

In the following detailed description, reference is made to the accompanying drawings that show by way of example only, specific closed loop embodiments in which the invention may be practiced. One skilled in the art would realize that these are exemplary only and not intended to limit application of the present invention in any sense, e.g., the location and arrangement of individual elements disclosed herein may be modified without departing from the spirit and scope of the invention as embodied in the appended claims. That is, the detailed description is not to be taken in any limiting sense, and the scope of the present invention is defined only by the appended claims and equivalents thereof, e.g., the transmitter can estimate and adjust Q. In the drawings, like numerals refer to the same or similar functionality throughout.

The present invention provides a plurality of low complexity techniques for obtaining the spatial diversity advantage provided by multiple transmit antennae beamforming and multiple receive antennae combining. The beamforming techniques of preferred embodiments of the present invention all require channel information at the transmitter.

FIG. 1 illustrates a closed loop comprising two wireless stations 101 105 which can be part of a wireless local area network (WLAN) including a mobile stations (laptop, personal digital assistant (PDA)) and can be access points for such WLANs. The wireless stations 101 105 can be part of wide area wireless network and wireless personal are networks. These stations 101 105 can comply with a wireless standard such as IEEE 802.11 or any other such standard, such compliance being partial or complete. However, wireless stations 101 105 each have a plurality of antennae and in the present invention the number is assumed to be asymmetric.

Given a transmit beamforming and receive combining multiple-antenna system (open or closed loop) with $N_T$ transmit antennae and $N_R$ receive antennae, assume that there $N_R$ data streams are transmitted and that the beamforming matrix is defined to be Q. Then the signal model is given by:

$$\underline{r} = HQ\underline{x} + \underline{n}$$

where n is a noise vector, the received vector r is a $N_R \times 1$ vector, the channel matrix H 103 is an $N_R \times N_T$ matrix, the beamforming matrix Q is an $N_T \times N_R$ matrix and x is a $N_R \times 1$ vector. The channel H is assumed to be known perfectly. The transmitted vector is y=Q x, which is an $N_T \times 1$ vector. In an OFDM system, the above signal model is repeated for each frequency bin. In a frequency selective channel, H and Q are different for each frequency bin.

In FIG. 1 a closed loop system 100 is assumed and current channel state information is transmitted between stations (STAs) 101 and 105 in order to reduce decoding complexity. STAs 101 and 105 each include multiple antennae, respectively $N_T 102_i$ and $N_R 104_j$, and together form system 100. The communications bandwidth used for this purpose is termed "feedback bandwidth" and is fed back from the receiver 105 to the transmitter 101 over a feedback channel 107 after being estimated by a channel estimator 106 that represents the current channel state information by a beamforming matrix Q which, in some preferred embodiments, is determined using singular value decomposition (SVD). The transmitter 101 uses the beamforming matrix Q to transmit each outgoing signal into multiple spatial channels.

If the matrix of eigenvectors P of a given matrix A is not a square matrix (for example, the matrix $$\begin{bmatrix} 1 & 1 \\ 0 & 1 \end{bmatrix}$$

has only the single eigenvector $^{(1, 0)}$), then P cannot have a matrix inverse, and hence A does not have an eigen decomposition. However, if A is an m×n real matrix with m>n, then A can be written using a so-called singular value decomposition of the form $A=UDV^T$. Here, U is an m×n matrix and V is an n×n square matrix, both of which have orthogonal columns so that $U^T U = V^T V = I$ and D is an n×n diagonal matrix. For a complex matrix A, the singular value decomposition is a decomposition into the form $A=U^H DV$ where U and V are unitary matrices, $U^H$ is the conjugate transpose of U, and D is a diagonal matrix whose elements are the singular values of the original matrix. If A is a complex matrix, then there always exists such a decomposition with positive singular values.

Let $H=USV^H$ be the SVD decomposition of the channel matrix H. Then, the optimal choice for Q is $Q=[\underline{V}_1 \underline{V}_2 \ldots \underline{V}_R]$ where $V_i$ is the $i^{th}$ column of matrix V The requirement that the transmitted power from each antenna be the same translates to the constraint that each row of the beamforming matrix Q has the same power. Since the eigenvectors $V_i$ are orthonormal, when R=T, each of the elements of transmitted vector v have the same transmitted power. However, when R<T, this is no longer true.

Figure 2:
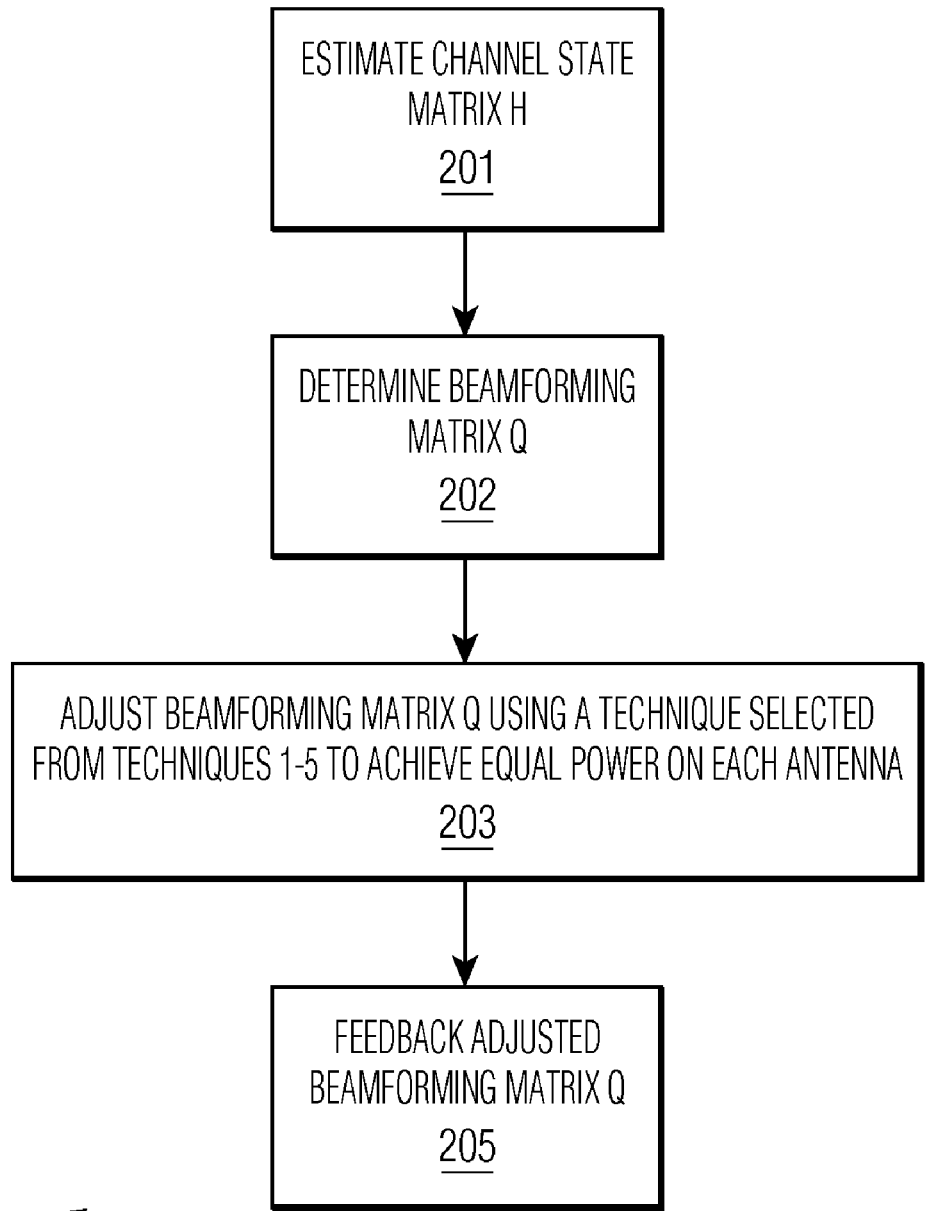
FIG. 2 illustrates a method of determining a beamforming matrix for a closed loop asymmetric communication system, according to the present invention.

FIG. 2 illustrates a method 200 according to the present invention. At step 201 the channel H is estimated. In a preferred embodiment, a modified channel estimator/power equalizer/[feedback] apparatus 300 is provided. However, when no feedback is required by a transmitter only a modified channel estimator/power equalizer apparatus is provided. In either case, a memory 301 is included in the apparatus and H 301.1 is stored therein at step 201. At step 202 a beamforming matrix Q 301.2 is determined (as described above) and store in the memory 301. Next, at step 203 the beamforming matrix Q 301.2 is adjusted using one of the following techniques, each comprising a separate preferred embodiment of the present invention, to ensure that the transmitted vector has equal power components. The adjusted beamforming matrix 301.3 is stored in the memory 301 of the apparatus 300.

Technique 1: Brute force normalization.

Start with $Q=[\underline{V}_1 \underline{V}_2 \ldots \underline{V}_R]$. Then normalize each row of Q to be unit power. The resultant beamforming matrix ensures equal power components of v.

Technique 2: Quantization to ±1±j values only.

Again, start with Q as defined above. Then Q1=sign[Re(Q))+jsign(Im(Q)] is a beamforming matrix that will not only have equal power components, but since each component can be only 1 of 4 values, result in fewer bits being used for feedback.

Technique 3: Optimization based on outage probability.

The foregoing techniques for obtaining a beamforming matrix with equal power rows do not incorporate any optimality criterion. Start with the assumption that each element of Q is ±1±j. Then the criterion for choosing Q is to maximize |det(HQ)|. Since there are $4^{N_T N_R}$ possible Q matrices, a brute force search would be too complex. Preferred simplifications that include: (1) since the phase of Q does not matter, $Q_{11}$ can be arbitrarily set to 1+j and (2) search only those columns that are orthogonal to each other. Using the foregoing two preferred simplifications, the search space is reduced dramatically. For example, in a 4×2 case, there are only 9 vectors that are orthogonal to a vector with entries ±1±j. Hence the search space reduces from 65536 to 64*9=576. Note that in this method, no SVD needs to be performed.

Technique 4: Hybrid Optimization.

Technique 3 above still requires optimization over a large number of possibilities. A further simplification is to use Technique 2 for the first vector, i.e., quantize the first vector of the SVD matrix and then use Technique 3 to determine the other vectors. For a 4×2 case, this requires performing the SVD, followed by an optimization over 9 possible choices.

Technique 5: Optimization across frequency domain.

If a single beamforming matrix is chosen for p channel frequency bins, the optimization criterion are to choose that Q that maximizes $$\sum_{i=1}^{p} |\det(H_i Q)|.$$

The search space is the same as before. Again, no SVD is required.

Referring now to FIG. 2, a method is illustrated for determining a beamforming matrix Q at in a closed loop that includes a receiver 105 and feeding Q back to a transmitter 101. At step 201 the receiver estimates the channel state in a matrix H. Then, at step 202 a beamforming matrix Q is estimated from H (as described above). At step 203, any of the techniques 1-5 of the present invention is used to adjust the matrix Q such that components have equal power and at step 204 the adjust beamforming matrix is fed back to the transmitter.

Figure 3:
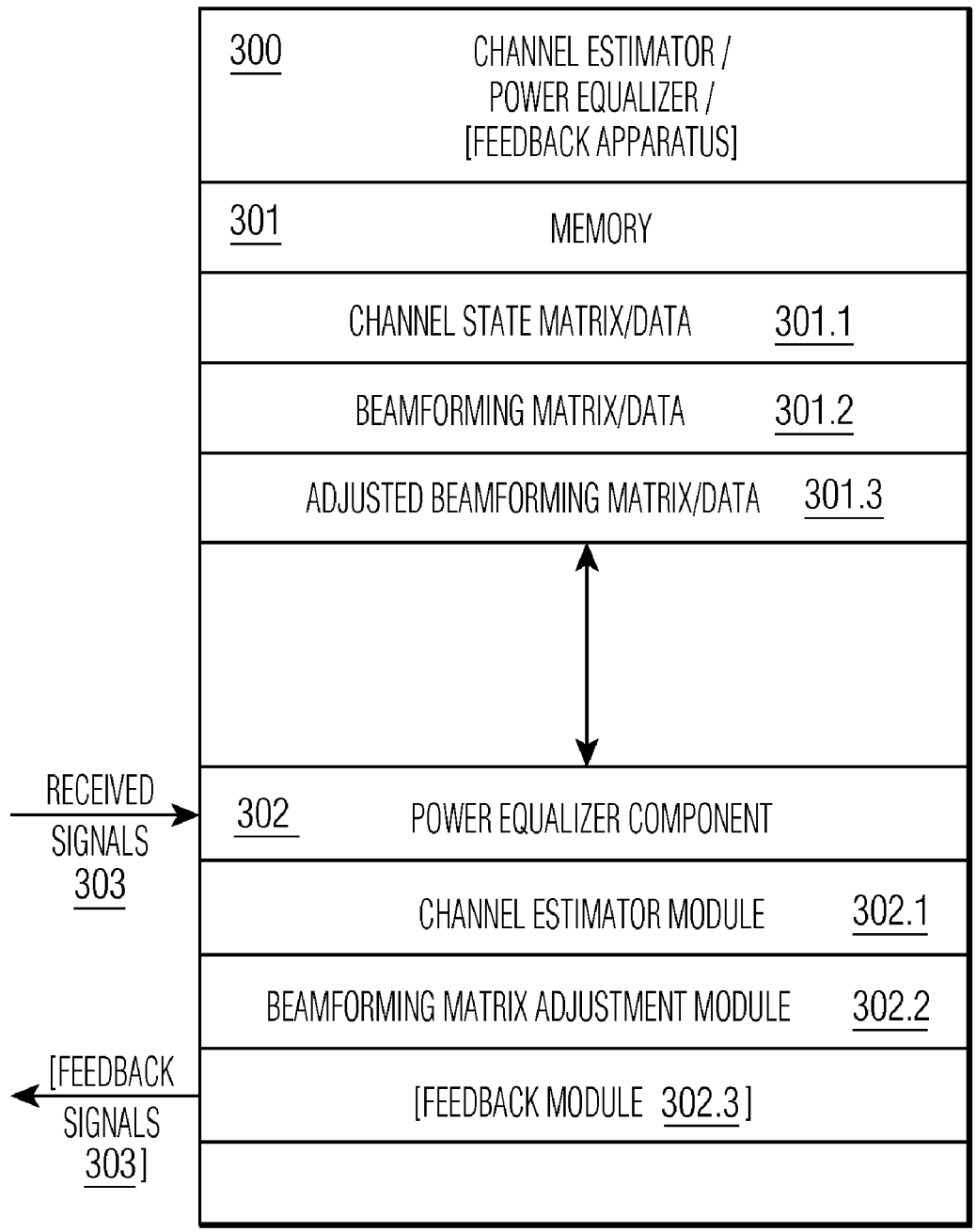
FIG. 3 illustrates a closed loop apparatus for determining and feeding back a beamforming matrix having equal power in an asymmetric communication system.

FIG. 3 illustrates a apparatus for channel estimation and feedback 300 in a closed loop, according to the present invention, including a memory 301 for storing channel state matrix H and related data 301.1, and the original beamforming matrix and related data 301.2 and the adjust beamforming matrix and related data according to the present invention 301.2. The apparatus 300 further includes a power equalizer component 302 that accepts received signals 303 for the channel H and includes a channel estimator module 302.1 to produce therefrom the channel matrix H and store it in the memory 301 as channel state matrix/data 301.1. The power equalizer component 302 further includes a beamforming matrix adjustment module 302.2 that forms an initial beamforming matrix, then adjusts 203 the initial beamforming matrix according to a pre-selected one of the techniques 1-5 of the present invention and stores the adjusted matrix Q and related data in the memory 301 as Adjusted beamforming matrix/data 301.3. Finally, the power equalizer component includes a feedback module 302.3 that feeds back the adjusted beamforming matrix Q as feedback signals 304 via the feedback channel 107 to the transmitter 101.

Figure 4:
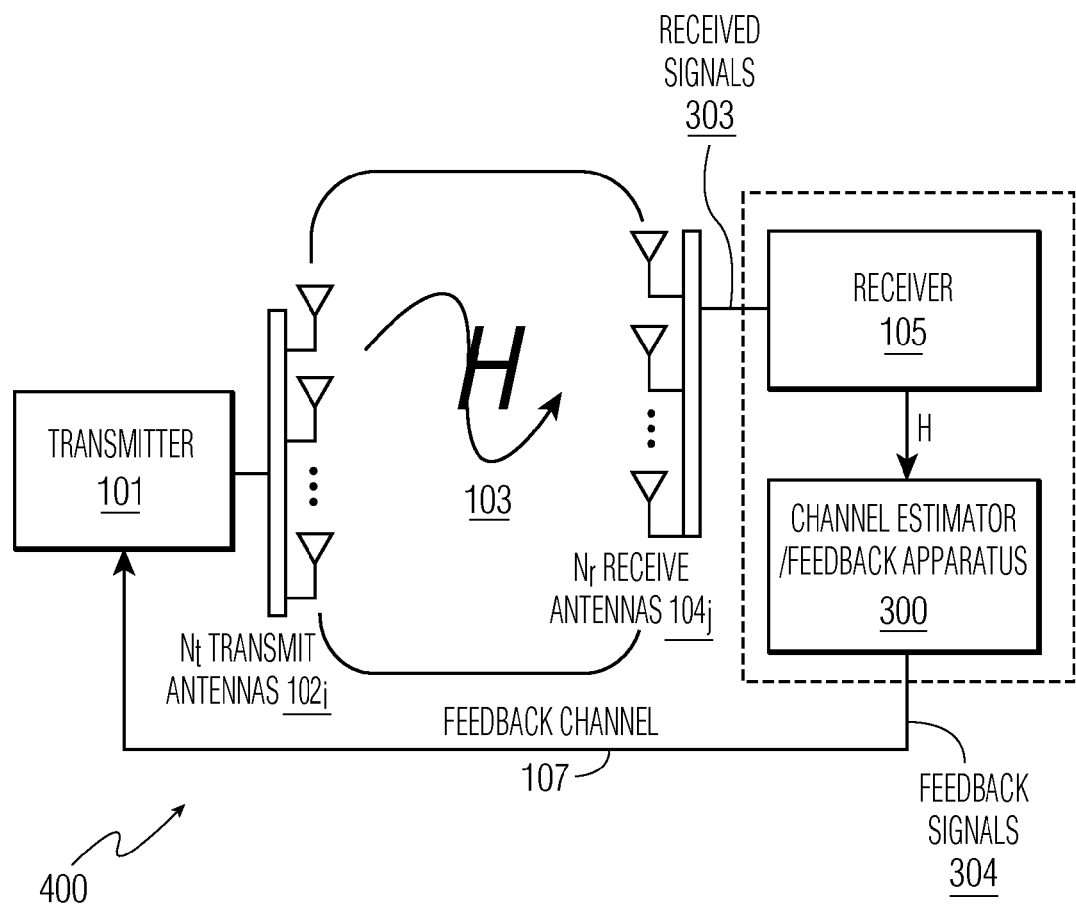
FIG. 4 illustrates an asymmetric closed loop communication system modified according to the present invention.

FIG. 4 illustrates a closed loop asymmetric communication system 400 that includes at least one transmitter 101 and a receiver 105 modified to interface to a channel estimator/feedback apparatus 300 configured according to the present invention and provide received signals 303 from the transmitter 101 concerning channel state H 103 thereto. The channel estimator/feedback apparatus 300 estimates the channel, creates and stores the channel matrix H and related data in the memory 301.1, creates and stores and initial beamforming matrix from the channel matrix H in the memory 301.2, and adjusts 203 the initial beamforming matrix according to a pre-selected one of the techniques 1-5 of the present invention and stores the adjusted beamforming matrix Q in the memory 301.3. Finally, the channel estimator/feedback apparatus 300 feeds back 204 the adjusted beamforming matrix Q 304 to the transmitter 101 using the feedback channel 107. As indicated above, the communication system 400 can adhere, either completely or in part, to any communication standard, such as IEEE 802.11 and can be part of any type of wireless communications network. The present invention is intended to apply to all asymmetric wireless communications networks/systems.

Figure 5:
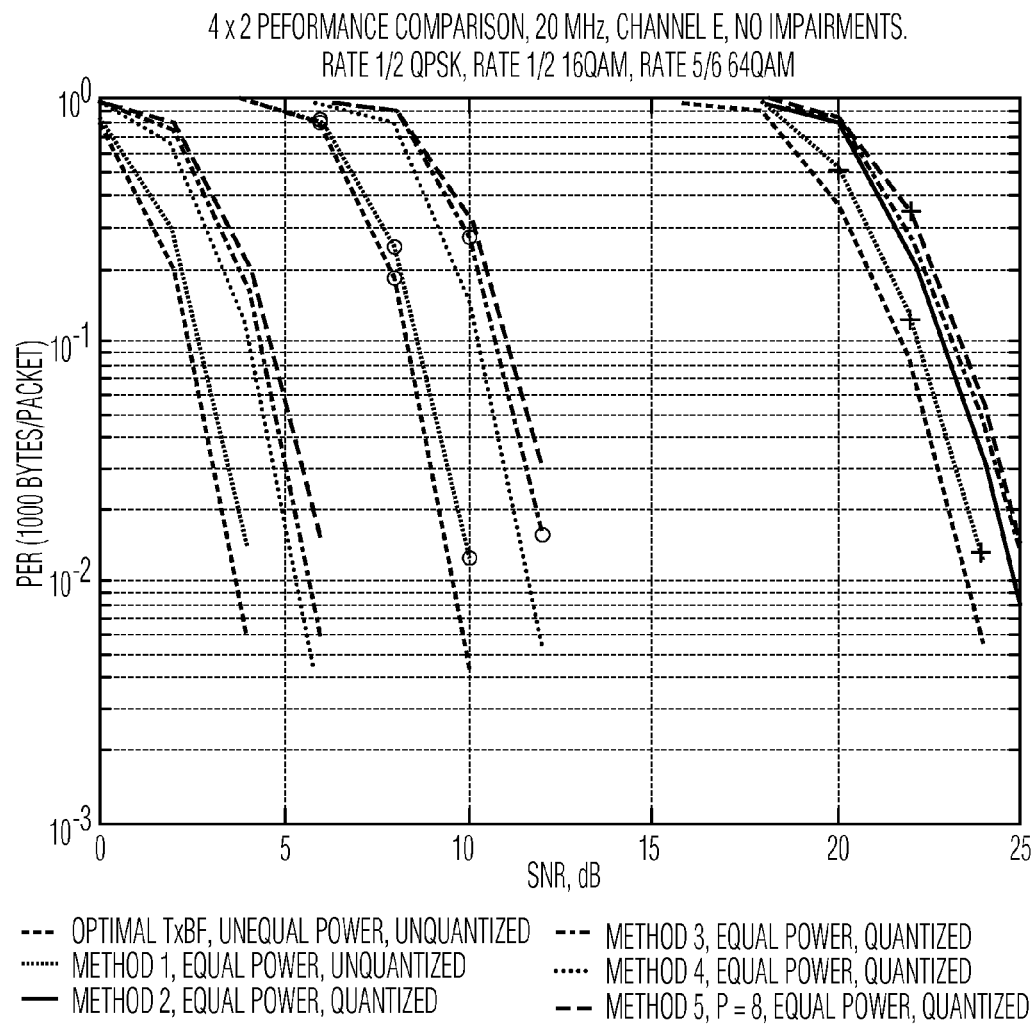
FIG. 5 illustrates performance of the various techniques for quantizing.

FIG. 5 illustrates performance of the various techniques for quantizing a 4×2 system in a frequency-selective system using bit-interleaved coded modulation. It can be seen that especially at the higher rates (rate 5/6 64 QAM) the techniques have very little performance loss compared to the optimal beamforming with unequal transmission power.

While the present invention has been described in conjunction with certain embodiments, namely closed loops, it is to be understood that one skilled in the art would realize that modifications and variations may be made without departing from the spirit and scope of the present invention as embodied in the appended claims. In particular, the transmitter can have knowledge of the channel and perform the method without requiring any feedback from the receiver.

I claim:

1. A method for asymmetrical beamforming transmission of a vector over a wireless channel H, comprising:
   providing a wireless communication system having $N_T$ transmit antennae and $N_R$ receive antennae, $N_T > N_R > 0$;
   adjusting a beamforming matrix Q with a pre-selected technique such that each row of Q has the same power; and
   transmitting by a transmitter the vector as $N_R$ data streams over the channel H using the adjusted beamforming matrix, wherein the transmitted $N_R$ data streams have equal power.

2. The method of claim 1, wherein: the pre-selecting an adjustment technique consists of pre-selecting brute force normalization; and performing the adjusting at the transmitter.

3. The method of claim 1, wherein the adjusting further comprises pre-selecting an adjustment technique from the group consisting of brute force normalization, quantization to $\pm 1 \pm j$ where $j > 0$, optimization based on outage probability, hybrid optimization, and optimization across frequency domain.

4. The method of claim 3, wherein the adjusting further comprises: estimating the channel H at a receiver; performing the adjusting at the receiver; and feeding back the adjusted beamforming matrix to the transmitter.

5. The method of claim 4, further comprising combining the transmitted and beamformed $N_R$ data streams by the receiver.

6. A beamforming transmitter apparatus, comprising:
   $N_T$ transmit antennae for beamforming transmission of a vector over a channel of $N_R$ data streams to $N_R$ receive antennae having $N_T > N_R > 0$;
   a power equalizer component determines an estimate of the channel and a beamforming matrix and therefrom adjusts the beamforming matrix to equalize beamforming transmit power across $N_R$ data streams in accordance with a brute force equalizing technique; and
   a transmitter that employs the adjusted beamforming matrix to transmit the vector as $N_R$ data streams having equal power.

7. A combining receiver apparatus, comprising:
   $N_R$ receive antennae for receipt and combination thereof of a beamformed transmission by a transmitter having $N_T$ transmit antennae of a vector over a channel of $N_R$ data streams having $N_T > N_R > 0$; and
   a channel estimator/power equalizer/feedback apparatus to provide, in accordance with a pre-selected equalizing technique, an adjusted beamforming matrix to be fed back for use by the transmitter to equalize a beamforming transmit power across said transmitted $N_R$ data streams, wherein each row of the adjusted beamforming matrix has the same power.

8. The receiver apparatus of claim 7, wherein the pre-selected equalizing technique is a technique to create the adjusted beamforming matrix selected from the group consisting of brute force normalization, quantization to $\pm 1 \pm j$ where $j > 0$, optimization based on outage probability, hybrid optimization, and optimization across frequency domain.

* * * * *